(12) United States Patent
Tsuchiya

(10) Patent No.: US 11,301,828 B2
(45) Date of Patent: Apr. 12, 2022

(54) CHECKOUT SYSTEM AND PORTABLE POINT-OF-SALE TERMINAL

(71) Applicant: TOSHIBA TEC KABUSHIKI KAISHA, Tokyo (JP)

(72) Inventor: Osamu Tsuchiya, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/921,413

(22) Filed: Jul. 6, 2020

(65) Prior Publication Data
US 2021/0090051 A1  Mar. 25, 2021

(30) Foreign Application Priority Data

Sep. 20, 2019  (JP) .............................. JP2019-171935

(51) Int. Cl.
| | |
|---|---|
| *G06Q 20/20* | (2012.01) |
| *H04W 4/029* | (2018.01) |
| *G06K 7/10* | (2006.01) |
| *G06Q 20/32* | (2012.01) |

(52) U.S. Cl.
CPC ....... *G06Q 20/202* (2013.01); *G06K 7/10821* (2013.01); *G06Q 20/209* (2013.01); *G06Q 20/325* (2013.01); *H04W 4/029* (2018.02)

(58) Field of Classification Search
CPC .. G06Q 20/202; G06Q 20/209; G06Q 20/325; G06Q 20/322; G06Q 20/204; H04W 4/029; G06K 7/10821; G07G 1/0081; G07G 1/12

USPC .......................................................... 705/21
See application file for complete search history.

(56) References Cited

U.S. PATENT DOCUMENTS

2016/0307171 A1* 10/2016 Haga .................... G06Q 20/202
2019/0172034 A1*  6/2019 Oishi .................... H04W 4/023

FOREIGN PATENT DOCUMENTS

JP       2012-042995 A      3/2012

OTHER PUBLICATIONS

Extended European Search Report dated Jan. 15, 2021, filed in counterpart European Patent Application No. 20191386.0, 7 pages.

* cited by examiner

*Primary Examiner* — Garcia Ade
(74) *Attorney, Agent, or Firm* — Kim & Stewart LLP

(57) ABSTRACT

A wireless checkout system includes peripheral stations, a server that stores location information indicating a position coordinate of each of the peripheral stations, one or more base stations, and a mobile point-of-sale (POS) terminal. The mobile POS terminal includes a wireless communication interface configured to receive a wireless signal from the base stations, a display, and a processor. The processor designates one of the peripheral stations as an associated peripheral station, determines a position coordinate of the mobile POS terminal based on the wireless signal, selects, based on the determined position coordinate of the mobile POS terminal and the location information, another of peripheral stations that is closest to the mobile POS terminal to be an alternative peripheral station to be recommended for the checkout, when the associated peripheral station is not available, and then controls the display to display a screen indicating the alternative peripheral station.

16 Claims, 10 Drawing Sheets

CHECKOUT SYSTEM AND PORTABLE POINT-OF-SALE TERMINAL

CROSS-REFERENCE TO RELATED APPLICATION

This application is based upon and claims the benefit of priority from Japanese Patent Application No. 2019-171935, filed on Sep. 20, 2019, the entire contents of which are incorporated herein by reference.

FIELD

Embodiments described herein relate generally to a checkout system for a retail store or the like and a portable point-of-sale (POS) terminal that can be used in the checkout system or otherwise.

BACKGROUND

A point-of-sale (POS) register application can be installed in an information processing device, such as a general-purpose tablet PC (Personal Computer), to permit the information processing device to be used as a portable POS terminal. The portable POS terminal can be wirelessly connected to a network provided in a store to use various, peripheral devices such as a receipt printer, an automatic coin change machine, or a scanner (e.g., a bar code scanner) connected to the network.

If one of the peripheral device is out of order in such a checkout system of this type, a reference proposes a technique for enabling an external information processing terminal to provide information indicating an operation state of the peripheral device(s).

However, there is the problem of keeping customers waiting if the peripheral device is out of order. In particular, the receipt printer often experiences failures because the receipt printer includes a mechanical paper conveying system that is more likely to fail with use. As a result, customers ready for checkout are frequently kept waiting until the receipt printer is repaired. Failures of other peripheral devices are also possible. For example, other peripheral devices including driving systems are more likely to break than peripheral devices that do not include driving systems. In addition to such failures, the peripheral devices may become unusable because of troubles such as a network failures or the like.

DETAILED DESCRIPTION

One or more embodiments are directed to providing a wireless checkout system and a portable POS terminal used in the system (and a control program for causing a computer to function as such a portable POS terminal) that can reduce a waiting time of a customer if a peripheral device normally available in the system is in an unusable state.

In general, according to an embodiment, a wireless checkout system includes a plurality of peripheral stations located in a store area, a server that stores location information indicating a position coordinate of each of the peripheral stations in the store area, one or more base stations having a wireless communication range covering the store area, and a mobile point-of-sale (POS) terminal. The mobile POS terminal includes a wireless communication interface configured to receive a wireless signal from at least one of the one or more base stations, a display, and a processor. The processor is configured to designate one of the plurality of peripheral stations as an associated peripheral station to be communicated with for checkout by the mobile POS terminal, determine a position coordinate of the mobile POS terminal based on the wireless signal received by the wireless communication interface, obtain the location information, selected, based on the position coordinate of the mobile POS terminal and the location information, a closest one of the plurality of peripheral stations to the mobile POS terminal, other than the associated peripheral station, to be an alternative peripheral station to be recommended for checkout, if the associated peripheral station is not available. The processor then controls the display to display a screen indicating the alternative peripheral station.

A checkout system and a portable POS terminal used in this system according to an embodiment that can reduce a waiting time of a customer if a peripheral device that the portable POS terminal attempts to communicate with is in an unusable state are explained with reference to the drawings.

Figure 1:
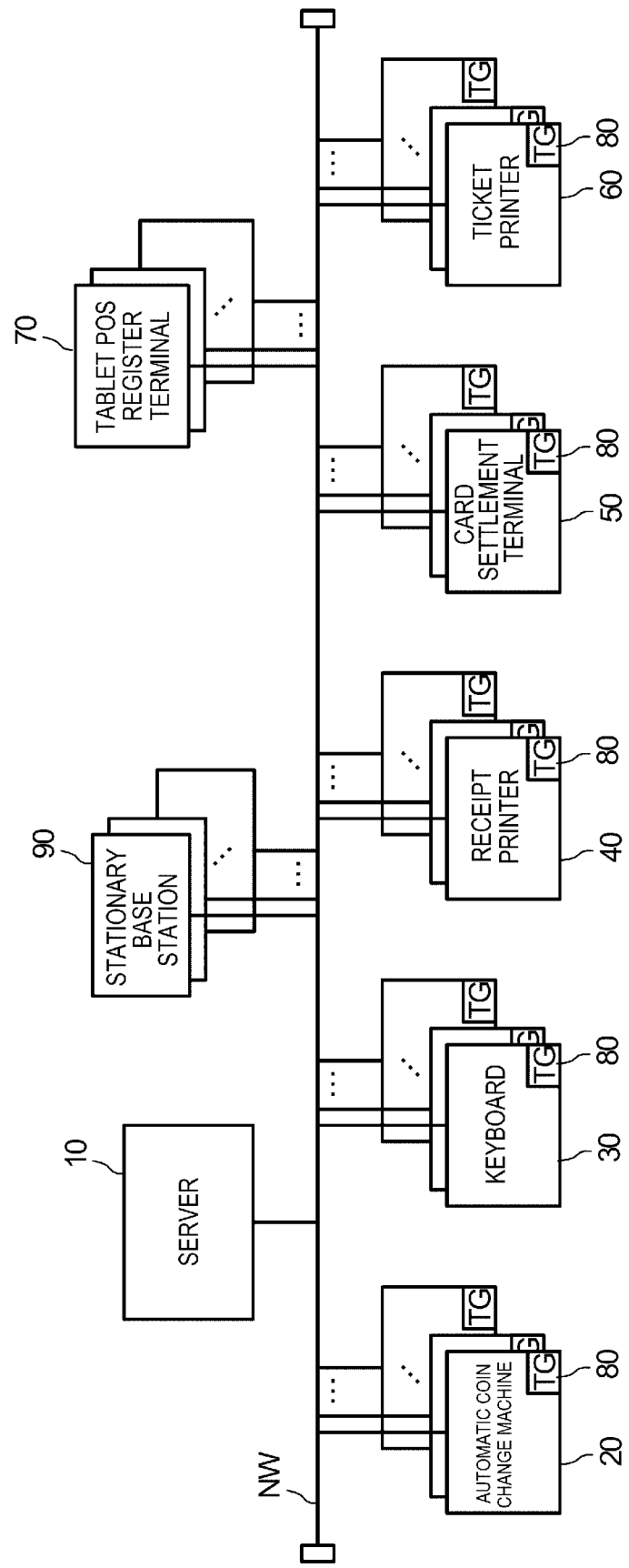
FIG. 1 illustrates a network of a checkout system according to an embodiment.

FIG. 1 is a diagram of the checkout system according to the embodiment. The checkout system includes a server 10, a plurality of automatic coin change machines 20, a plurality of keyboards 30, a plurality of receipt printers 40, a plurality of card settlement terminals 50, and a plurality of ticket printers 60 functioning as peripheral devices (may be referred to as peripheral stations) and a plurality of tablets 70. The checkout system may be referred to as a wireless checkout system or a mobile POS checkout system. The tablet 70 is the portable POS terminal according to the present embodiment. The tablet 70, in this context, is an example of a hand-held or mobile POS terminal. The server 10, the plurality of types of peripheral devices, and the plurality of tablets 70 are connected to one another via a network NW such as a LAN (Local Area Network) provided in a store. The server 10 is connected to the network NW by wire via a gateway. The plurality of types of peripheral devices are connected to the network NW by wire. At least any one type among the peripheral devices or a least one of at least one type of peripheral devices may be wirelessly connected to the network NW via an access point. The plurality of tablets 70 are wirelessly connected to the network NW via an access point. The checkout system includes the plurality of types of peripheral devices. However, the checkout system may include only one peripheral device. Similarly, the checkout system may include only one tablet 70.

The server 10 is a store server for, for example, collecting data of commodities registered by the tablets 70 and managing sales, stocks, and the like of the entire store. The automatic coin change machine 20 includes a depositing port and a dispensing port for cash. The automatic coin change machine 20 counts, for each of denominations, the number of coins or bills deposited from the deposit port to calculate a deposit amount and transmits data of the deposit amount to the tablet 70. The automatic coin change machine 20 dispenses cash equivalent to coin from the dispensing port based on coin data received from the tablet 70. Various keys for auxiliary input for the tablet 70 are disposed on the keyboard 30. The receipt printer 40 prints a receipt. The card settlement terminal 50 is a terminal for performing payment by a credit card or an electronic money medium. The ticket printer 60 prints a ticket such as a discount ticket.

The tablet 70 has at least the following first to fourth functions. The first function is a function of registering sales data of commodities purchased by a customer. The second function is a function of generating payment data based on the registered commodity sales data. The third function is a function of receiving price payment from a customer based on the generated payment data and settling a commercial transaction with the customer. The fourth function is a function of generating a printing job for a receipt indicating details of the commercial transaction and wirelessly transmitting the printing job to the receipt printer 40.

The checkout system further includes position measurement tags (abbreviated as TG in FIG. 1) attached to or incorporated in the respective peripheral devices and a plurality of stationary base stations 90 connected to the network NW. The plurality of stationary base stations 90 are connected to the network NW by wire. The plurality of stationary base stations 90 may be directly connected to the server 10 by an exclusive line separate from the network NW.

Figure 2:
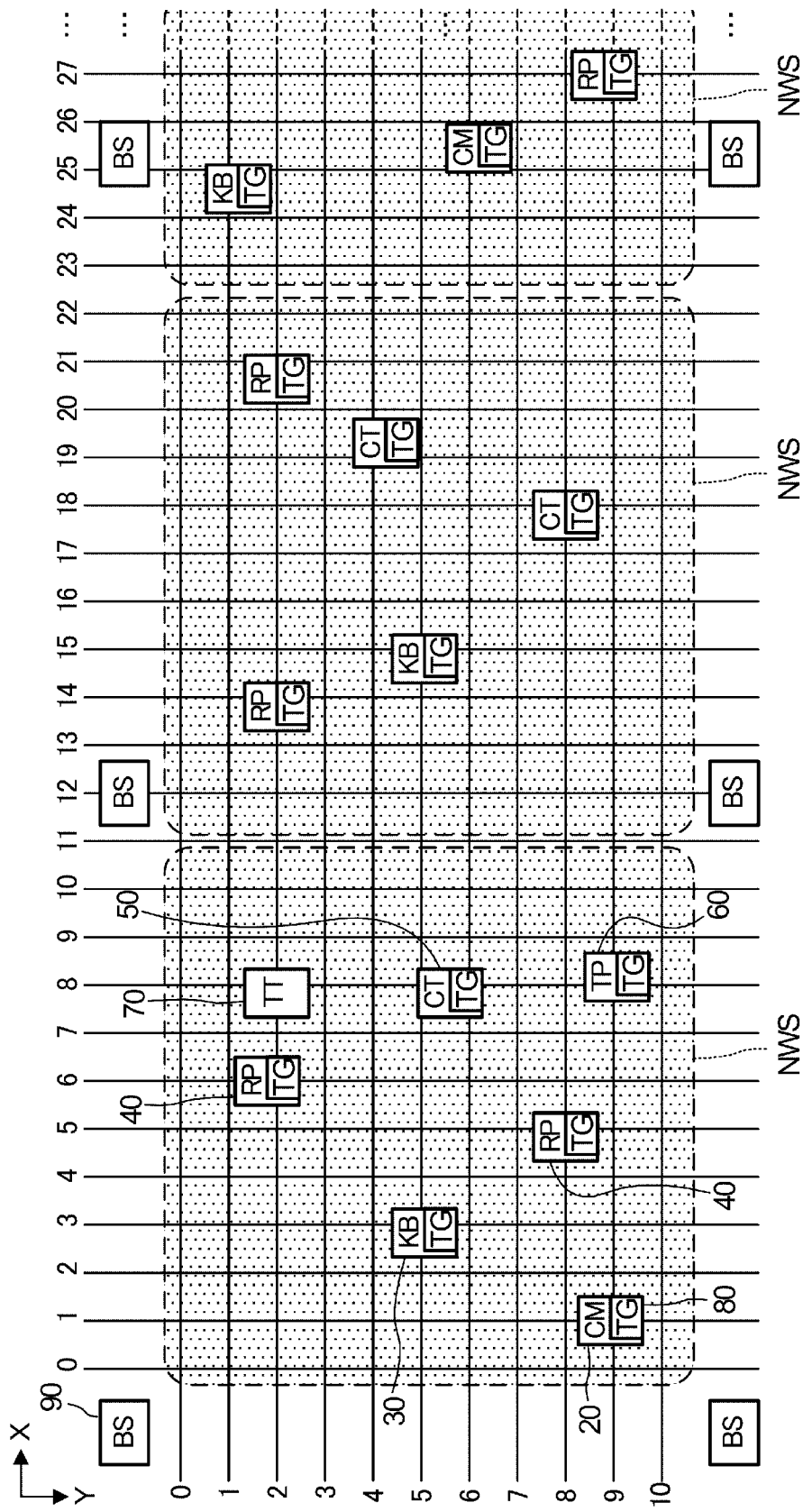
FIG. 2 is a schematic diagram illustrating a positional relation among elements in a checkout system to an embodiment.

FIG. 2 is a schematic diagram illustrating a physical positional relation among elements in the checkout system in a store area. In FIG. 2, the reference sign "NWS" represents network segments in the network NW connected to one another by bridges or the like. In an embodiment, the store area may consist of a plurality of network segments NWS. The automatic coin change machines 20 are abbreviated as "CM," the keyboards 30 are abbreviated as "KB," the receipt printers 40 are abbreviated as "RP," the card settlement terminals 50 are abbreviated as "CT," the ticket printers 60 are abbreviated as "TP," the tablets 70 are abbreviated as "TT," the position measurement tags 80 are abbreviated as "TG," and the stationary base stations 90 are abbreviated as "BS." As illustrated in FIG. 2, the stationary base stations 90 are fixedly set in predetermined positions in the store. The stationary base stations 90 are suitably set at equal intervals in an X direction and a Y direction, for example, on a ceiling of the store but are not limited to this arrangement. A positional relation between the network segments NWS and the stationary base stations 90 is not particularly limited either.

The position measurement tags 80 and the stationary base stations 90 are connected to the network NW and function as measurement devices that measure position coordinates of the respective peripheral devices in the store. The stationary base stations 90 transmits BLE (Blue Tooth® Low Energy) waves or UWB (Ultra Wide Band) waves. The position measurement tags 80 receive the BLE waves or the UWB waves. Position coordinates of the position measurement tags 80, that is, position coordinates of peripheral devices to which the position measurement tags 80 are attached can be measured based on incident angles and arrival times of the BLE waves or the UWB waves. Alternatively, the position measurement tags 80 transmit BLE waves or UWB waves and the stationary base stations 90 receive the BLE waves or UWB waves. Position of the position measurement tags 80 can be measured based on incident angles and arrival times of the BLE waves or the UWB waves at the stationary base stations 90. For example, in in FIG. 2, as position coordinates of the three receipt printers 40, (x, y)=(5, 8), (x, y)=(14, 2), and (x, y)=(27, 9) are measured.

Figure 3:
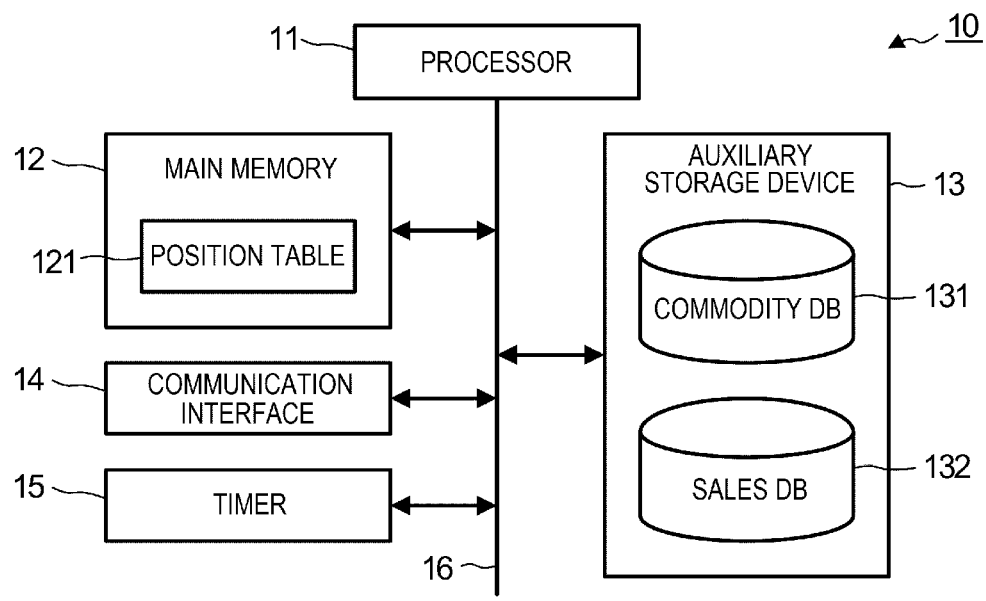
FIG. 3 is a block diagram illustrating aspects of a configuration of a server.

FIG. 3 is a block diagram illustrating a configuration of the server 10. The server 10 includes, as illustrated in FIG. 3, a processor 11, a main memory 12, an auxiliary storage device 13, a communication interface 14, a timer 15, and a system transmission line 16. The system transmission line 16 includes an address bus, a data bus, and a control signal line. In the server 10, the processor 11, the main memory 12, the auxiliary storage device 13, the communication interface 14, and the timer 15 are connected to the system transmission line 16. In the server 10, the processor 11, the main memory 12, and the auxiliary storage device 13 form a computer and the system transmission line 16 connects the foregoing components.

The processor 11 controls the units in order to perform various functions according to an operating system or application programs (software programs). The processor 11 is, for example, a CPU (Central Processing Unit).

The main memory 12 includes a nonvolatile memory region and a volatile memory region. The main memory 12 stores the operating system or the application programs in the nonvolatile memory region. The main memory 12 can store, in the nonvolatile or volatile memory region, data necessary for the processor 11 to execute processing for controlling the units. The main memory 12 uses the volatile memory region as a work area in which data is rewritten as appropriate by the processor 11. The nonvolatile memory region is, for example, a ROM (Read Only Memory). The volatile memory region is, for example, a RAM (Random Access Memory). In this embodiment, a position table 121, which stores position coordinates of the peripheral devices, is in the volatile memory region of the main memory 12.

For example, an EEPROM (Electric Erasable Programmable Read-Only Memory), an HDD (Hard Disk Drive), or an SSD (Solid State Drive) can be the auxiliary storage device 13. The auxiliary storage device 13 stores data used by the processor 11 in performing various kinds of processing, data created by processing in the processor 11, and the like. The auxiliary storage device 13 sometimes stores the application programs. In the auxiliary storage device 13, a commodity database (DB) 131, a sales database (DB) 132, and the like are provided. The commodity database 131 stores, for each of commodities sold in the store, commodity records in which various commodity data and information are described. The commodity record includes a commodity code (may also be referred to as a product code), a price, and a commodity name. The commodity code is an identification code of a corresponding commodity. The sales database 132 stores sales records in which sales data (transaction records)

can be provided by such matters/items as a commodity type, a store department, a time period range, a date, a week, or a month. The sales data includes the number of sold items and a sales amount.

The communication interface 14 is connected to the network NW. The communication interface 14 performs, according to a communication protocol, data communication between the communication interface 14 and other devices connected via the network NW.

The timer 15 starts a time tracking operation according to a command from the processor 11. The timer 15 times out if a preset time is reached. A time when the timer 15 times out can be optionally set.

Figure 4:
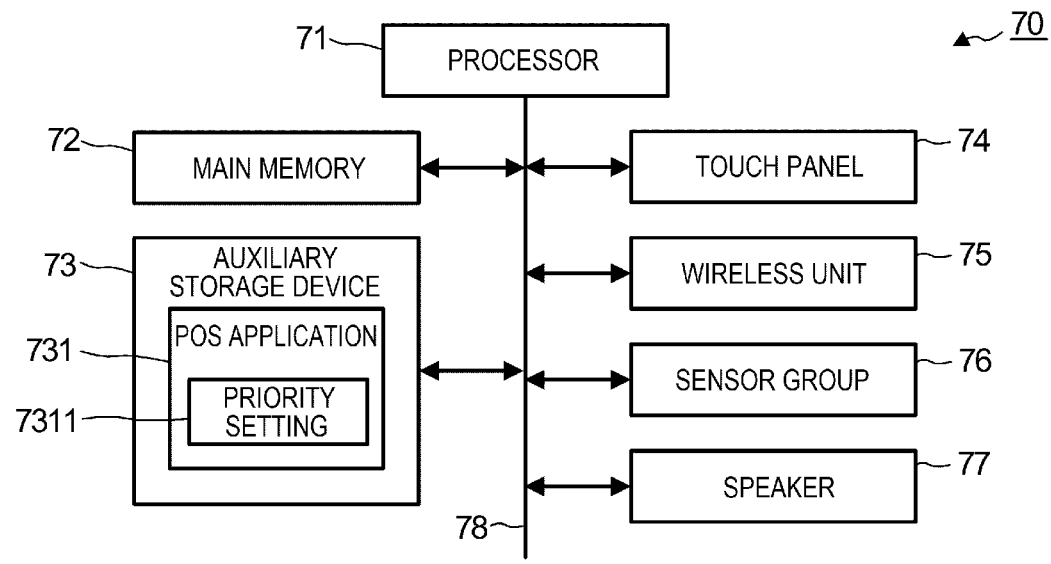
FIG. 4 is a block diagram illustrating aspects of a tablet functioning as a portable POS terminal according to an embodiment.

FIG. 4 is a block diagram illustrating a configuration of the tablet 70. The tablet 70 in this example is a general-purpose tablet PC. The tablet 70 downloads and installs a control program according to the present embodiment. The control program is also referred to as a POS register application. The tablet 70 executes the control program to function as the portable POS terminal according to the present embodiment. The tablet 70 includes, as illustrated in FIG. 4, a processor 71, a main memory 72, an auxiliary storage device 73, a touch panel 74, a wireless unit 75, a sensor group 76, a speaker 77, and a system transmission line 78. The system transmission line 78 includes an address bus, a data bus, and a control signal line. In the tablet 70, the processor 71, the main memory 72, the auxiliary storage device 73, the touch panel 74, the wireless unit 75, the sensor group 76, and the speaker 77 are connected to the system transmission line 78.

The processor 71 controls the units in order to perform various functions according to an operating system and/or application programs. The processor 71 is, for example, a CPU.

The main memory 72 includes a nonvolatile memory region and a volatile memory region. The main memory 72 stores the operating system or the application programs in the nonvolatile memory region. The main memory 72 sometimes stores, in the nonvolatile or volatile memory region, data necessary for the processor 71 to execute processing for controlling the units. The main memory 72 uses the volatile memory region as a work area in which data is rewritten as appropriate by the processor 71. The nonvolatile memory region is, for example, a ROM. The volatile memory region is, for example, a RAM.

For example, an EEPROM or an SSD can be the auxiliary storage device 73. The auxiliary storage device 73 stores data used by the processor 71 in performing various kinds of processing, data created by processing in the processor 71, and the like. The auxiliary storage device 73 may store the application programs. In this embodiment, the auxiliary storage device 73 stores a POS register application 731 (abbreviated as "POS application" in FIG. 4). The auxiliary storage device 73 provides a priority setting memory 7311 that stores priority setting information, which is data that the processor 71 rewrites as appropriate during execution of the POS register application 731.

The touch panel 74 is a device functioning as both of an input device and a display device of the tablet 70. The touch panel 74 functions as a display. The touch panel 74 detects a touch position for a displayed image and outputs information concerning the touch position to the processor 71. The touch panel 74 displays, for example, names, prices, and total amounts of commodities registered by the tablet 70.

The wireless unit 75 is connected to the network NW via an access point and performs data communication with the server 10 and the peripheral devices. The wireless unit 75 functions as a network interface unit. The wireless unit 75 may be referred to as a wireless communication interface. The wireless unit 75 has a function of transmitting or receiving a BLE wave or a UWB wave and thus can perform substantially the same functions as a position measurement tag 80. The wireless unit 75 further functions as a detecting unit. For example, in the example illustrated in FIG. 2, (x, y)=(8, 2) is detected as a position coordinate of the tablet 70. If the wireless unit 75 is not adapted to the BLE wave or the UWB wave, as in the peripheral devices, the position measurement tag 80 may be attached to the tablet 70.

The sensor group 76 includes a camera, a GPS sensor, a gyro sensor, and the like. The camera can read a code symbol such as a barcode or a two-dimensional data code attached to a commodity. The camera may thus serve as an optical code reader. The speaker 77 outputs warning sound or the like.

The POS register application 731 is an application for causing the processor included in the tablet 70 to function as an acquiring unit, a presenting unit, a setting unit, a designating unit, and a selecting unit. The POS register application 731 can be stored in the auxiliary storage device 73 and accessed by communication performed via a network. The POS register application 731 may be recorded in a removable recording medium such as a CD-ROM or a memory card and distributed. In this case, the POS register application 731 can be read from the recording medium by a recording medium reader connected to the tablet 70 or a recording medium reader included in or connected to a personal computer that can communicate with the tablet 70 and can be stored in the auxiliary storage device 73.

The acquiring unit acquires, from the network NW, position coordinates of a respective plurality of peripheral devices, position coordinates of which in the store can be acquired, connected to the network NW. The presenting unit is a unit that, if a first peripheral device is unusable when communication with the first peripheral device is attempted via the network NW, presents, as a use recommended device (may be referred to as an alternative peripheral device or station), a second peripheral device at a position coordinate the shortest distance from the tablet 70 (excepting the first peripheral device). The setting unit sets a peripheral-device-to-be-preferentially-used (preferred peripheral device) among the plurality of peripheral devices. The designating unit designates whether the peripheral-device-to-be-preferentially-used or a peripheral device at the position coordinate the shortest distance from the tale 70 is prioritized. The selecting unit selects, as the first peripheral device, the peripheral device designated by the designating unit. In some examples, the selecting unit may select without reference to the designation by the designating unit, the peripheral-device-to-be-preferentially-used (may be referred to as an associated peripheral device or station). Alternatively, the selecting unit may select, without depending on the setting by the setting unit or the designation by the designating unit, the peripheral device at the position coordinate at the shortest distance from the tablet 70 as the first peripheral device.

Figure 5:
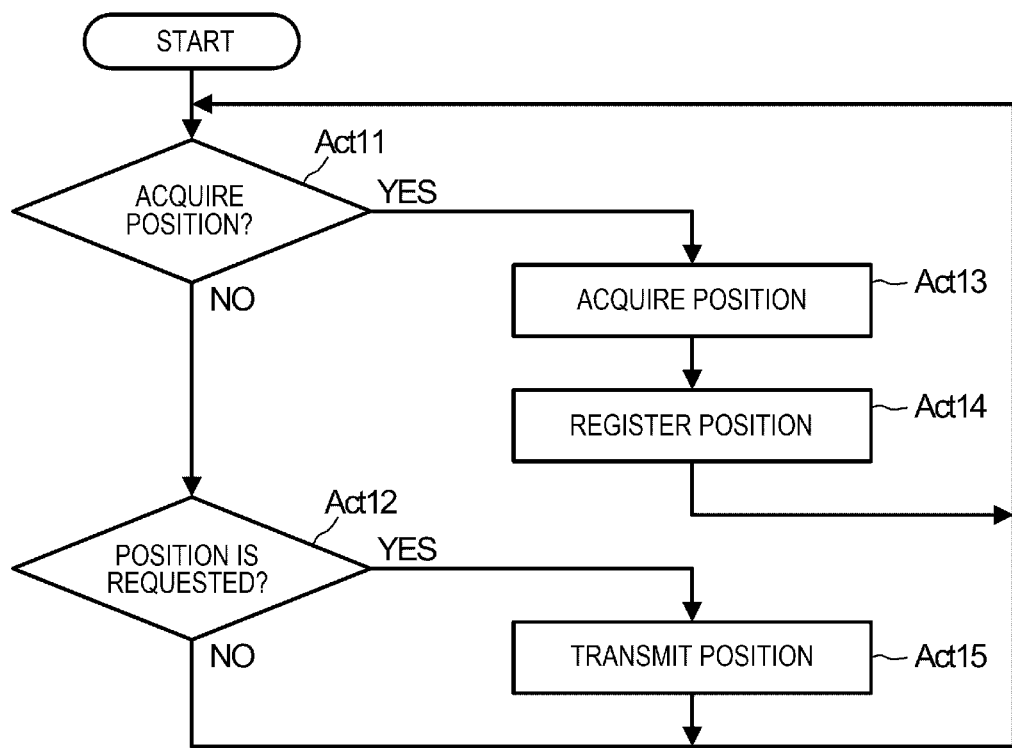
FIG. 5 is a flowchart illustrating aspects of position coordinate control processing executed by a processor of a server.
Figure 6:
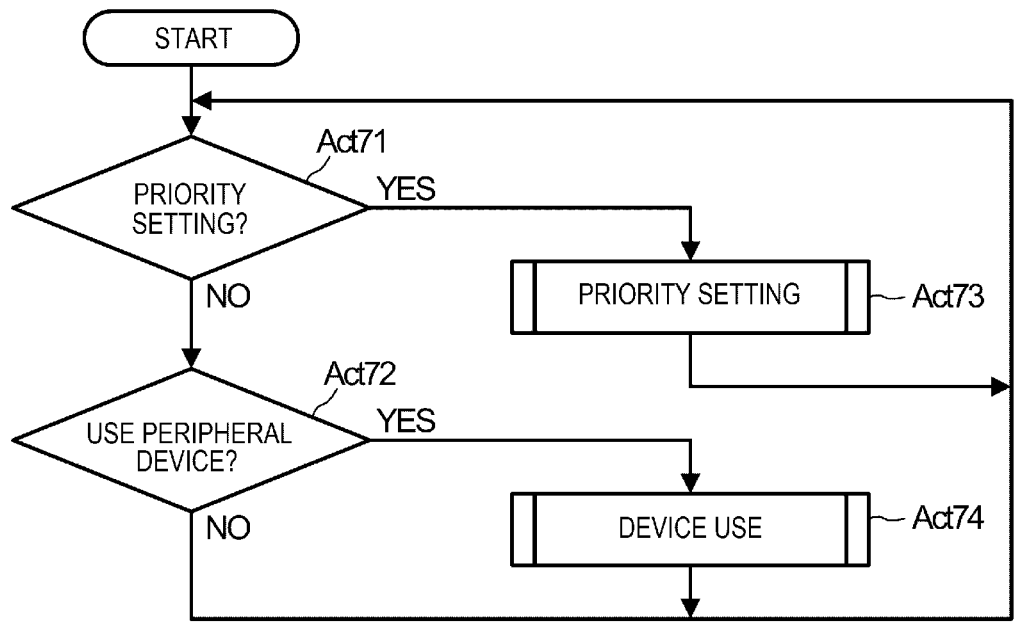
FIG. 6 is a flowchart illustrating aspects of a peripheral device-use processing executed by a processor of a tablet.

In the following explanation, the operation of the checkout system according to the embodiment is specifically explained with reference to the flowcharts of FIGS. 5 and 6. Content of processing explained with reference to FIGS. 5 and 6 is an example. A processing procedure and processing content are not particularly limited if the same result can be obtained.

FIG. 5 is a flowchart illustrating an example of a procedure of position coordinate control, which is one of many kinds of control processing executed by the processor 11 of the server 10. As illustrated in FIG. 5, in Act 11, the processor 11 determines whether to acquire a position coordinate of a peripheral device. This determination can be performed by determining whether acquisition timing predetermined in order to acquire a position coordinate of the peripheral device comes. It is optional to determine to which degree the acquisition timing is set. Unlike the tablet 70, the peripheral device does not frequently move. Therefore, the acquisition timing may be a several seconds to several ten seconds interval. This interval can be set as a tracked time of the timer 15. Therefore, in Act 11, if the timer 15 times out, the processor 11 can determine to acquire a position coordinate of the peripheral device. If not acquiring a position coordinate of the peripheral device, the processor 11 determines NO in Act 11 and the process proceeds to Act 12. In Act 12, the processor 11 determines whether a transmission request for location information including a position coordinate designating a type of a peripheral device such as a receipt printer is received from any tablet 70 via the network NW. If a transmission request for location information is received from no tablet 70, the processor 11 determines NO in Act 12 and the process proceeds to Act 11.

If the acquisition timing for acquiring a position coordinate of the peripheral device when the timer 15 times out comes, the processor 11 determines YES in Act 11 and the process proceeds to Act 13. In Act 13, the processor 11 acquires position coordinates from the respective peripheral devices, that is, the plurality of automatic coin change machines 20, the plurality of keyboards 30, the plurality of receipt printers 40, the plurality of card settlement terminals 50, and the plurality of ticket printers 60. In Act 14, the processor 11 registers the acquired position coordinates of the peripheral devices in the position table 121 provided in the main memory 12. At this time, the processor 11 causes the timer 15 to start a time tracking operation. Thereafter, the process proceeds to Act 11.

If receiving a transmission request for location information from any tablet 70 via the network NW, the processor 11 determines YES in Act 12 and the process proceeds to Act 15. In Act 15, the processor 11 transmits location information including a position coordinate of the peripheral device of the designated type registered in the position table 121 to the tablet 70 at a request source via the network NW. Thereafter, the process proceeds to Act 11.

FIG. 6 is a flowchart illustrating an example of a procedure of peripheral device-use processing, which is one of a large number of kinds of control processing by the POS register application 731 executed by the processor 71 of the tablet 70.

In Act 71, the processor 71 of the tablet 70 determines whether processing for priority setting is instructed by operation of the touch panel 74. The processing for priority setting is processing for setting a peripheral device to be preferentially used among the plurality of peripheral devices. For example, the processor 71 determines whether a touch position for a [priority setting] button image displayed on the touch panel 74 is touched or whether a touch position for a corresponding item image is touched from a menu item displayed according to touch on a touch position for a [menu] button image. "Button" discussed above and described hereinafter is an example of a selectable object unless the button is in a non-selectable state, in which case may be referred to as a "non-selectable object". If the processing for priority setting is not instructed, the processor 71 determines NO in Act 71 and the process proceeds to Act 72. The processor 71 determines whether use of any peripheral device is instructed by operation of the touch panel 74. For example, the processor 71 determines whether a touch position for a button image indicating peripheral device operation content such as a [receipt print] button image displayed on the touch panel 74 is touched or whether a touch position for a corresponding item image is touched from a menu item displayed according to touch on a touch position for the [menu] button image. If use of a peripheral device is not instructed, the processor 71 determines NO in Act 72 and the process proceeds to Act 71.

If the processing for priority setting is instructed, the processor 71 determines YES in Act 71 and the process proceeds to Act 73. In Act 73, the processor 71 performs priority setting processing for setting a peripheral device to be preferentially used. Thereafter, the process proceeds to Act 71.

Figure 7:
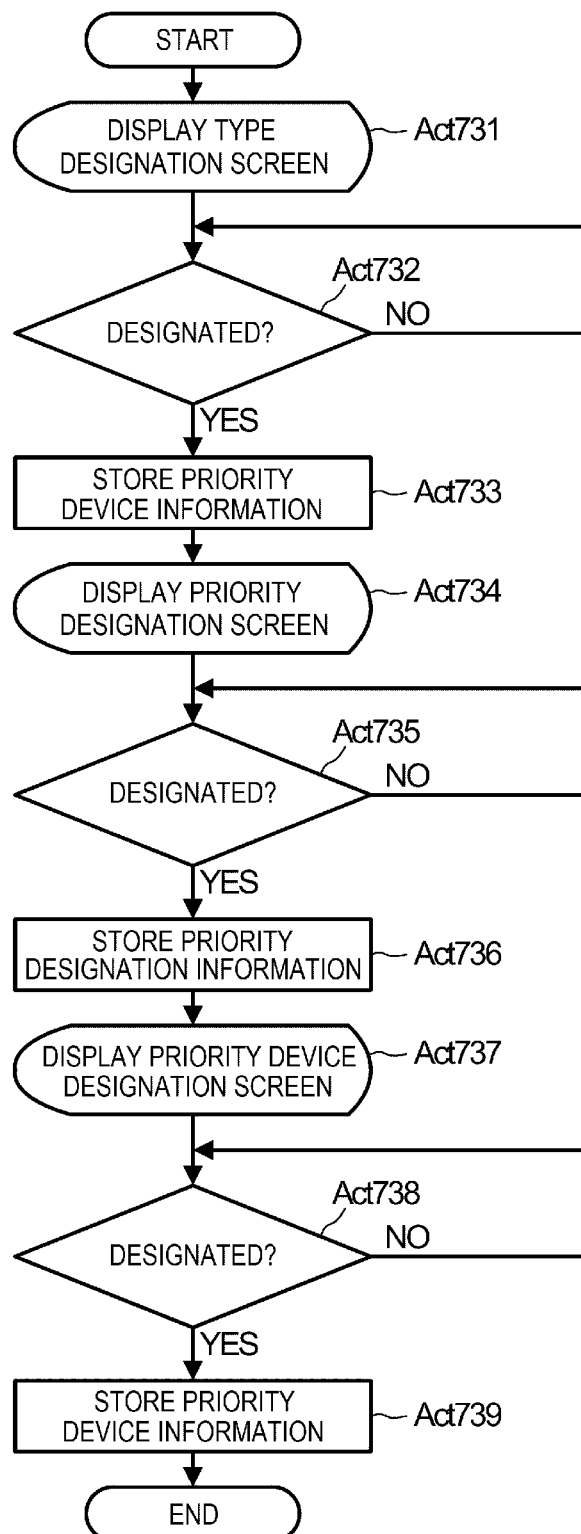
FIG. 7 is a flowchart illustrating aspects of priority setting processing.

FIG. 7 is a flowchart illustrating an example of a procedure of the priority setting processing in Act 73. FIGS. 8 to 11 are schematic diagrams illustrating examples of screens displayed on the touch panel 74 of the tablet 70 in the priority setting processing.

Figure 8:
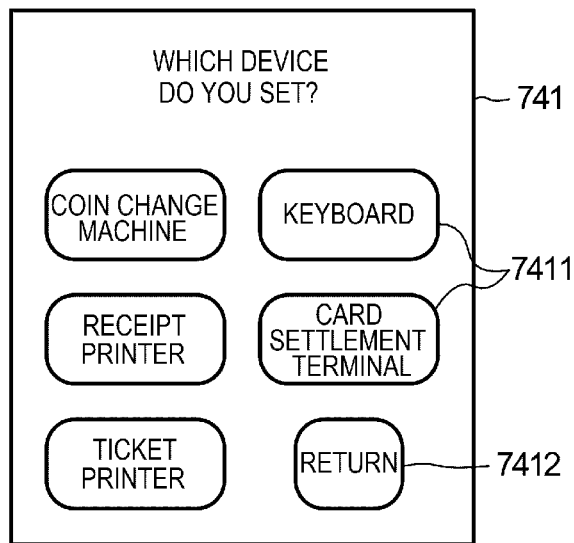
FIGS. 8-11 are schematic diagrams illustrating examples of screens displayed on a tablet.

In the priority setting processing, in Act 731, as illustrated in FIG. 8, the processor 71 causes the touch panel 74 to display a type designation screen 741. The type designation screen 741 is a screen for designating a type of a peripheral device to be preferentially set. The type designation screen 741 includes a plurality of peripheral device type designation button images 7411 for designating a peripheral device. As illustrated in FIG. 8, the type designation screen 741 may include a [return] button image 7412 for instructing return to an immediately preceding screen even if the processing for priority setting is stopped. Thereafter, the process proceeds to Act 732 and waits for any peripheral device to be set. In other words, the processor 71 waits for a touch position for any peripheral device type designation button image 7411 to be touched. If a touch position for any peripheral device type designation button image 7411 is touched, in Act 733, the processor 71 causes the priority setting memory 7311 to store, as one of priority setting information, priority device information indicating a peripheral device corresponding to the touch position. Thereafter, the process proceeds to Act 734.

Figure 9:
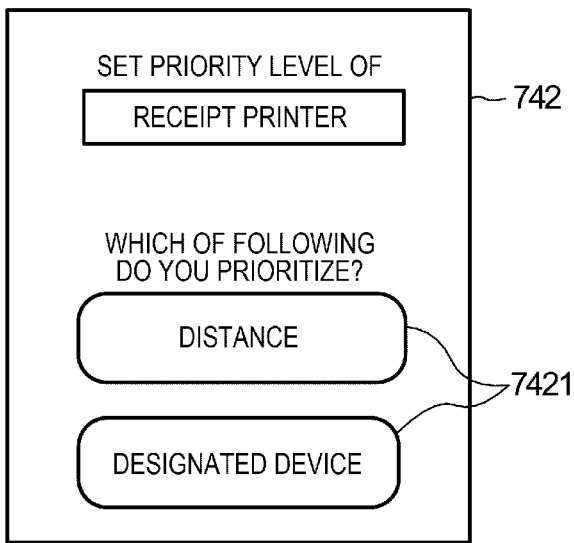

In Act 734, as illustrated in FIG. 9, the processor 71 causes the touch panel 74 to display a priority designation screen 742. The priority designation screen 742 is a screen for designating, concerning the peripheral device designated on the type designation screen 741, in an example illustrate in FIG. 9, a receipt printer, which of a distance and the designates device is prioritized. The priority designation screen 742 includes two priority designation button images 7421 for designating the distance or the designated device to be prioritized. Thereafter, the process proceeds to Act 735 and waits for any peripheral device to be designated. In other words, the processor 71 waits for a touch position for any priority designation button image 7421 to be touched. If the touch position for any priority designation button image 7421 is touched, in Act 736, the processor 71 causes the priority setting memory 7311 to store, as one of priority setting information, priority designation information indicating priority designation corresponding to the touch position. In this way, the processor 71 functions as a designating unit. Thereafter, the process proceeds to Act 737.

Figure 10:
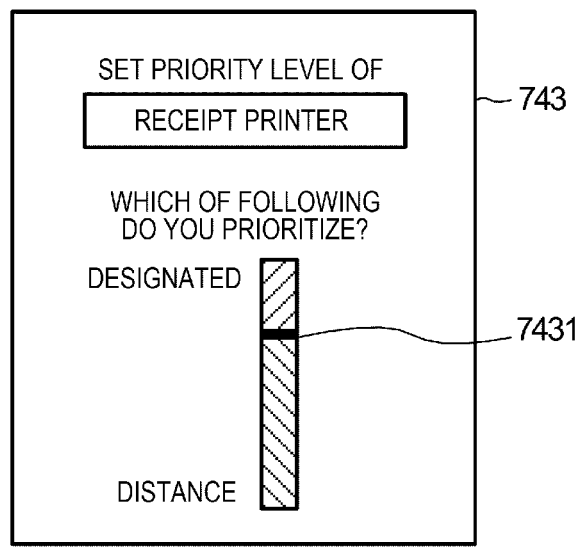

If a touch position for any peripheral device type designation button image 7411 is touched, the processor 71 may cause the touch panel 74 to display a priority designation screen 743 illustrated in FIG. 10 rather than the priority designation screen 742 illustrated in FIG. 9. The priority designation screen 743 is a screen for designating, concerning the peripheral device designated on the type designation screen 741, in an example illustrated in FIG. 10, a receipt printer, which of a distance and the designated device is prioritized and to which degree the distance or the designated device is prioritized. The priority designation screen 743 includes the slider image 7431 for designating the priority to be prioritized. Thereafter, the process proceeds to Act 735 and the processor 71 waits for a priority level to be designated. In other words, the processor 71 waits for any touch position corresponding to a slider image 7431 to be touched. If any touch position is touched, in Act 736, the processor 71 causes the priority setting memory 7311 to store, as one of priority setting information, priority designation information indicating priority level designation corresponding to the touch position. Priority levels of 0 to 100% can be set according to a position touched for the slider image 7431. In this way, the processor 71 functions as a designating unit. Thereafter, the process proceeds to Act 737.

Figure 11:
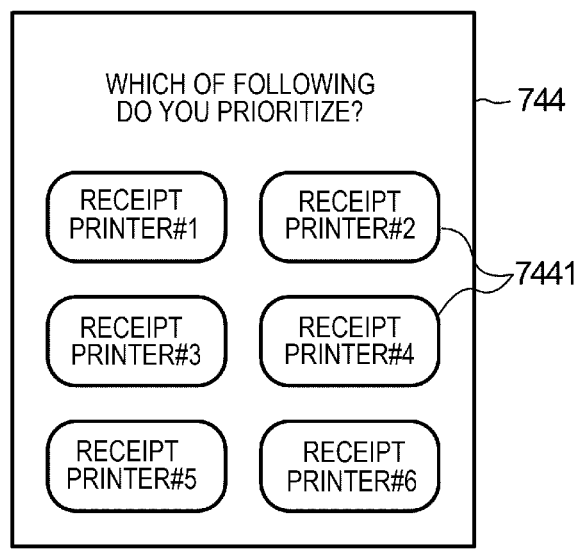

In Act 737, as illustrated in FIG. 11, the processor 71 causes the touch panel 74 to display a priority device designation screen 744. The priority device designation screen 744 is a screen for designating, concerning the peripheral device designated on the type designation screen 741, in an example illustrated in FIG. 11, a receipt printer, which device is designated as a priority device. The priority device designation screen 744 includes a plurality of priority device designation button images 7441 for designating the priority device. The priority device designation screen 744 includes not only peripheral devices present in the network segment NWS in which the tablet 70 is located but also peripheral devices present in the other network segments NWS. If the number of peripheral devices is large and the peripheral devices cannot be displayed on one screen, the screen is scrolled or switched by scroll operation. Thereafter, the process proceeds to Act 738 and waits for any peripheral device to be designated. In other words, the processor 71 waits for a touch position for any priority device designation button image 7441 to be touched. If a touch position for any priority device designation button image 7441 is touched, in Act 739, the processor 71 causes the priority setting memory 7311 to store, as one of priority setting information, priority device designation information indicating priority device designation corresponding to the touch position. In this way, the processor 71 functions as a setting unit. Thereafter, the process returns to Act 71 in FIG. 6.

Priority setting can be performed for each of types of the plurality of peripheral devices.

If it is instructed to use any peripheral device, the processor 71 determines YES in Act 72 and the process proceeds to Act 74. In Act 74, the processor 71 performs device-use processing for using the peripheral device. Thereafter, the process proceeds to Act 71.

Figure 12A:
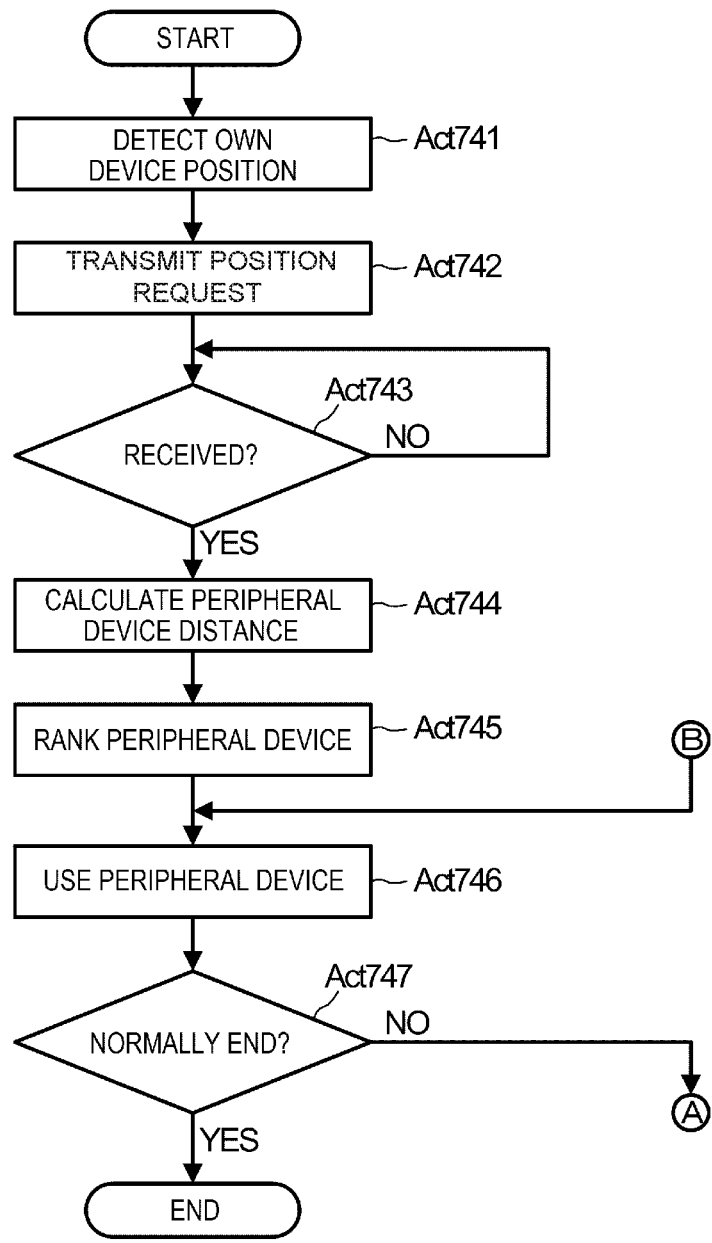
FIG. 12A is a diagram illustrating a first portion of a flowchart illustrating an example of a procedure of device-use processing.
Figure 12B:
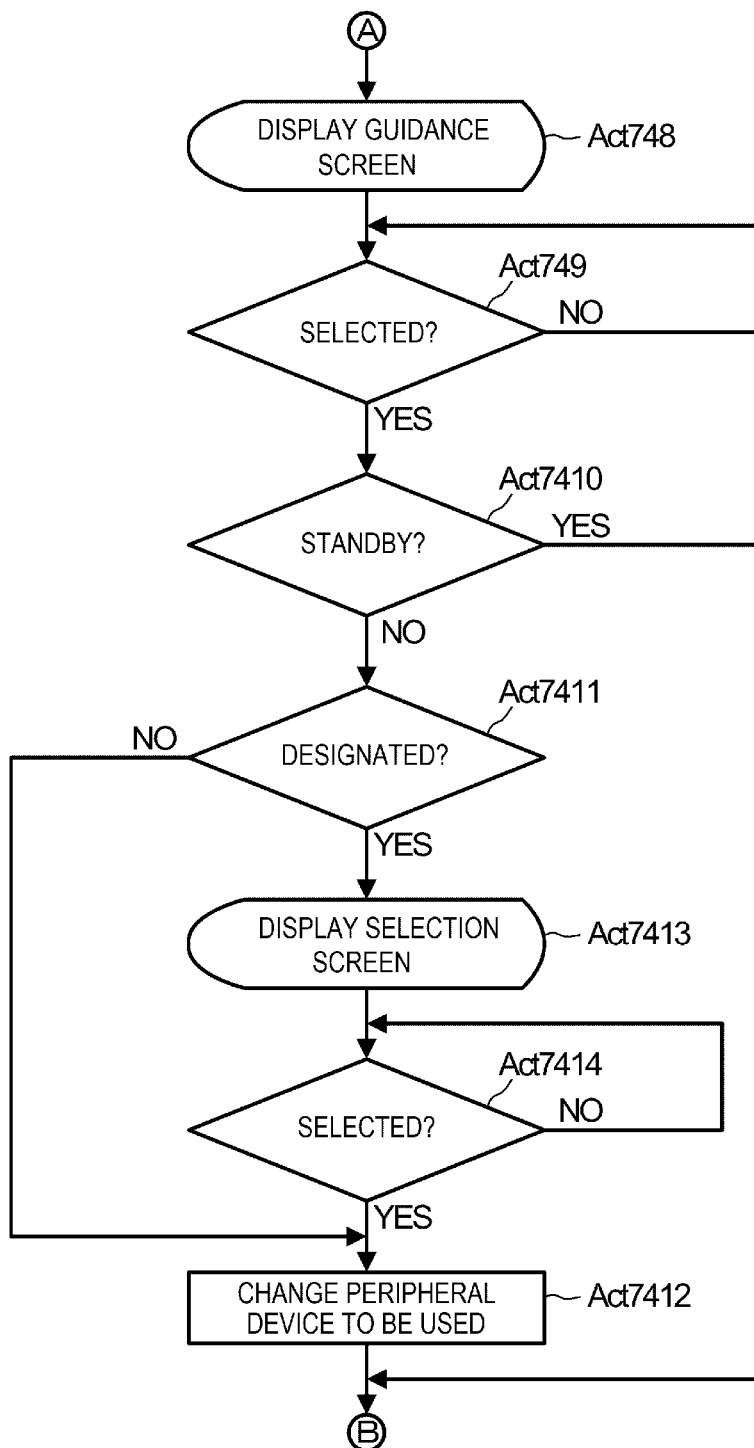
FIG. 12B is a diagram illustrating a second portion of the flowchart illustrating the example of the procedure of device-use processing.
Figure 13:
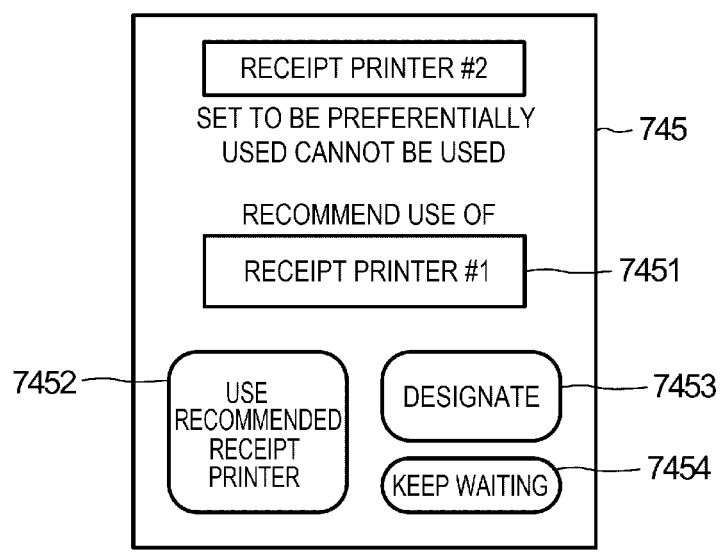
FIGS. 13-14 are schematic diagrams illustrating examples of screens displayed on a tablet.
Figure 14:
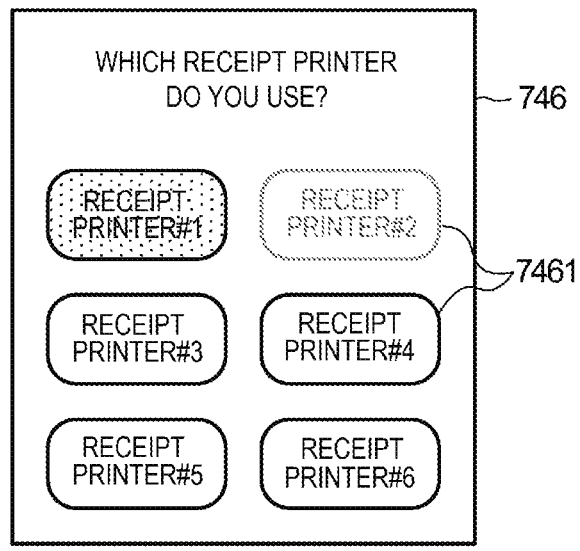

FIGS. 12A and 12B are flowcharts illustrating an example of a procedure of the device-use processing in Act 74. FIGS. 13 and 14 are schematic diagrams illustrating examples of screens displayed on the touch panel 74 of the tablet 70 in the device-use processing.

In the device-use processing, in Act 741, the processor 71 controls the wireless unit 75 to detect a position coordinate of its own device (that is, the device incorporating the processor 71) in the store. Thereafter, the processor 71 controls the wireless unit 75 to transmit a transmission request for location information including a position coordinate concerning a peripheral device of a type instructed to the server 10 via the network NW. The process proceeds to Act 743 and the processor 71 waits for the position coordinate of the peripheral device from being received from the server 10 by the wireless unit 75.

If the server 10 transmits a position coordinate of a peripheral device of a designated type registered in the position table 121 and the position coordinate of the peripheral device is received by the wireless unit 75, the processor 71 determines YES in Act 743 and the process proceeds to Act 744. In this way, the processor 71 functions as an acquiring unit. In Act 744, the processor 71 calculates distances between itself (its own device location) and peripheral devices based on the its detected position coordinate in the store and position coordinates of the acquired peripheral devices of the designated type. The distances are typically linear distances. However, if a complicated passage is formed by arrangements in the store, a store map may be stored in the auxiliary storage device 73 in advance and a moving distance along a route (that a potentially non-straight line distance) may be calculated in this context. In Act 745, the processor 71 ranks the peripheral devices based on the calculated distances and the priority setting information stored in the priority setting memory 7311. For example, concerning the receipt printer 40, if a receipt printer #2 is designated as a priority device and the priority designation is the designated device, the processor 71 ranks the receipt printer #2 in the first place and ranks the peripheral devices in the second and subsequent places in ascending order of the distances. If the priority designation is the distance, the processor 71 ranks the peripheral device at the shortest distance in the first place and ranks the peripheral devices in the second and subsequent places in ascending order of the distances. If a type of a peripheral device designated to be used is a type for which priority setting information is not stored in the priority setting memory 7311, the processor 71 performs ranking based on the distances. The processor 71 selects the peripheral device in the first place as a first peripheral device attempted to be communicated with. In this way, the processor 71 functions as a selecting unit. Thereafter, the process proceeds to Act 746.

In At 746, the processor 71 executes a procedure for using the peripheral device ranked in the first place. For example, the processor 71 generates a print job for a receipt and controls the wireless unit 75 to transmit the print job to the receipt printer #2 in the first place. Thereafter, the process proceeds to Act 747. In Act 747, the processor 71 determines whether the procedure normally ends. A response signal indicating the normal end is returned from the receipt printer 40 that successfully normally executes the print job. A response signal indicating an abnormal end is returned from the receipt printer 40 that does not successfully normally execute the print job. If receiving the response signal indicating the normal end within a predetermined time, the processor 71 determines that the print job normally ends. If receiving the response signal indicating the abnormal end within the predetermined time or if not successfully receiving the response signal indicating the normal end or the abnormal end within the predetermined time, the processor 71 determines that the print job does not normally end. The predetermined time is determined based on a normal processing time statistically requested for each of the types of the peripheral devices. For example, the predetermined time is approximately three seconds for the receipt printer 40.

If the use of the peripheral device normally ends, the processor 71 determines YES in Act 747 and the process returns to Act 71 in FIG. 6.

If the use of the peripheral device does not normally end, the processor 71 determines NO in Act 747 and the process proceeds to Act 748. In Act 748, the processor 71 causes the touch panel 74 to display a guidance screen 745 as illustrated in FIG. 13. The guidance screen 745 is a screen for notifying that a preferentially designated peripheral device cannot be used and presenting a peripheral device recommended as an alternative device for the peripheral device. In other words, the guidance screen 745 includes a use recommended device display area 7451 for presenting such a peripheral device. The peripheral device displayed in the use recommended device display area 7451 is the peripheral device in the second place ranked in Act 745, that is, the second peripheral device present in a position coordinate at the shortest distance from the tablet 70 except the first peripheral device, which is the preferentially designated peripheral device. In this way, the processor 71 functions as a presenting unit.

The guidance screen 745 includes, as illustrated in FIG. 13, a recommendation button image 7452, a designation button image 7453, and a standby button image 7454. The recommendation button image 7452 is an image of a button touched when instructing use of the peripheral device recommended as the alternative device. The recommendation button image 7452 has a display area larger than display areas of the other buttons. The designation button image 7453 is an image of a button touched when instructing use of a peripheral device other than the recommended peripheral device. The standby button image 7454 is an image of a button touched when instructing to continue the use of the preferentially designated peripheral device. After displaying the guidance screen 745, the process proceeds to Act 749 and the processor 71 waits for operation that should be performed next to be selected. In other words, the processor 71 waits for a touch position for any one of the recommendation button image 7452, the designation button image 7453, and the standby button image 7454 to be touched. If any touch position is touched, the process proceeds to Act 7410.

In Act 7410, the processor 71 determines whether the touch position for the standby button image 7454 is touched. If the touch position for the standby button image 7454 is touched, the processor 71 determines YES in Act 7410, and the process returns to Act 746, where the processor 71 attempts to communicate with the preferentially designated peripheral device again. Retry may be prevented from being repeated many times by restricting the standby button image 7454 to be displayed only a predetermined number of times such as twice.

If the touch position for the standby button image 7454 is not touched, the processor 71 determines NO in Act 7410 and the process proceeds to Act 7411. In Act 7411, the processor 71 determines whether the touch position for the designation button image 7453 is touched. If the touch position for the designation button image 7453 is not touched, that is, the touch position for the recommendation button image 7452 is touched, the processor 71 determines NO in Act 7411 and the process proceeds to Act 7412. In Act 7412, the processor 71 changes the peripheral device to be used to the recommended peripheral device in this case. The process returns to Act 746 and the processor 71 attempts to communicate with the peripheral device changed from the peripheral device to be used.

If the touch position for the designation button image 7453 is touched, the processor 71 determines YES in Act 7411 and the process proceeds to Act 7413. In Act 7413, the processor 71 causes the touch panel 74 to display a selection screen 746 as illustrated in FIG. 14. The selection screen 746 includes a plurality of peripheral device button images 7461 for designating the peripheral device to be used. The peripheral device button image 7461 corresponding to the recommended peripheral device, in an example illustrated in FIG. 14, the receipt printer #1 is displayed in a form different from a form of the other peripheral devices such that the peripheral device button image 7461 can be identified. The peripheral device button image 7461 corresponding to an unusable peripheral device, which does not normally end, in the example illustrated in FIG. 14, the receipt printer #2 is displayed in an un-selectable display form. If the number of peripheral devices is large and the peripheral devices cannot be displayed on one screen, the screen is scrolled or switched by scroll operation. Thereafter, the process proceeds to Act 7414 and the processor 71 waits for any peripheral device to be designated. In other words, the processor 71 waits for a touch position for any peripheral device button image 7461 to be touched. If the touch position for any peripheral device button image 7461 is touched, the processor 71 determines YES in Act 7414 and the process proceeds to Act 7412. In Act 7412, the processor 71 changes the peripheral device to be used to the designated peripheral device in this case. The process returns to Act 746 and the processor 71 attempts to communicate with the peripheral device changed from peripheral device to be used.

In this way, according to this embodiment, if communication with the first peripheral device is attempted in the tablet 70 and the first peripheral device is unusable, the second peripheral device present in a position coordinate at the shortest distance from the tablet 70 except the first peripheral device is presented as the use recommended device. Accordingly, it is possible to find the use recommended device presented when the peripheral device attempted to be communicated from the tablet 70 is in an unusable state and switch a use destination to another peripheral device. Therefore, it is possible to reduce a waiting time of a customer. Since it can be found which peripheral device is a switching destination, it is possible to easily guide the customer to the position of the peripheral device.

It can be selected in advance whether the first peripheral device will be a peripheral device close to the tablet 70 or a peripheral device designated to be preferentially used. Accordingly, it is possible to use an appropriate peripheral device corresponding to a situation of the customer or the store.

If the first peripheral device is the peripheral device close to the tablet 70, the waiting time of the customer can be reduced. Time for guiding the customer to another position or time for the customer moving to the position can be saved.

If the first peripheral device is the peripheral device desired to be preferentially used, a peripheral device in a predetermined position can be used first. Therefore, the customer is not guided to a position unexpected by the customer. It is less likely to confuse the customer.

The checkout system and the portable POS terminal used in this system according to the embodiment that can reduce a waiting time of a customer if a peripheral device that the portable POS terminal attempts to communicate with is in an unusable state are explained above. Such an embodiment is not limited to this.

For example, in the embodiment, the position measurement tag 80 is attached to each of the peripheral devices and a position coordinate is periodically measured. However, the measurement of a position coordinate may be unnecessary for a peripheral device used in a substantially fixed position. In other words, a position coordinate may be measured at a setting time of the peripheral device and stored and the stored position coordinate may be repeatedly used.

If displaying the guidance screen in Act 748, the tablet 70 may emit alarm sound with the speaker 77 to call attention.

If the general-purpose tablet terminal functioning as the tablet 70 includes a microphone, the tablet 70 may be configured to be able to perform selection and instruction by voice without depending on the touch.

The portable POS terminal is not limited to the tablet PC and may be a notebook PC. The portable POS terminal may be a hand-held type POS terminal. However, the portable POS terminal may be a POS terminal of any form and shape so long as the portable POS terminal is a POS terminal that can be moved by or with a user by, for example, being carried by the user, attached to the user, or attached to a cart or the like moving with the user or any POS terminal that is not fixed but can be moved about in a store.

In the embodiment, a portable POS terminal and a checkout system are explained as examples. However, embodiments can also be applicable to other devices and systems.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless checkout system, comprising:
a plurality of receipt printers located in a store area, each of the receipt printers including a paper conveyer;
a server that stores location information indicating a position coordinate of each of the receipt printers in the store area;
one or more base stations having a wireless communication range covering the store area; and
a mobile point-of-sale (POS) terminal including:
a wireless communication interface configured to receive a wireless signal from at least one of the one or more base stations;
a display; and
a processor configured to:
set one of the plurality of receipt printers as an associated receipt printer to be communicated with by the mobile POS terminal for receipt printing;
determine a position coordinate of the mobile POS terminal based on the wireless signal received by the wireless communication interface;
obtain the location information from the server;
select, based on the position coordinate of the mobile POS terminal and the location information, a closest one of the plurality of receipt printers that is closest to the mobile POS terminal, other than the associated receipt printer, to be an alternative receipt printer to be recommended for receipt printing;
generate a print job and control the wireless communication interface to transmit the print job to cause the associated receipt printer to print a receipt based on the print job;
determine whether or not the print job is properly executed by the associated receipt printer based on a response signal from the associated receipt printer;
control the display to display a screen indicating the alternative receipt printer, when determining that the print job is not properly executed by the associated receipt printer; and
cause the alternative receipt printer to print the receipt upon a user operation to use the alternative receipt printer on the screen.

2. The wireless checkout system according to claim 1, wherein each of the plurality of receipt printers is configured to determine its position coordinate based on a wireless signal from at least one of the one or more base stations and transmit its position coordinate to the server.

3. The wireless checkout system according to claim 1, wherein the screen also indicates the associated receipt printer.

4. The wireless checkout system according to claim 1, wherein the screen includes a selectable object for selecting one of the plurality of receipt printers to be used for receipt printing.

5. The wireless checkout system according to claim 1, wherein the screen includes a selectable object corresponding to the alternative receipt printer for selecting use of the alternative receipt printer for receipt printing and a non-selectable object corresponding to the associated receipt printer.

6. The wireless checkout system according to claim 5, wherein
the selectable object corresponding to the alternative receipt printer has a predetermined shape and is displayed in a first display manner, and
the screen includes one or more second selectable objects corresponding to receipt printers that are not closest to the mobile POS terminal, the second selectable objects having the predetermined shape and being displayed in a second display manner different from the first display manner.

7. The wireless checkout system according to claim 1, wherein the processor is further configured to control the display to display a screen for selecting one of the plurality of receipt printers as the associated receipt printer.

8. The wireless checkout system according to claim 1, wherein the mobile POS terminal further includes an optical code reader configured to read a product code.

9. A method for a mobile point-of-sale (POS) terminal for a wireless checkout system including a plurality of receipt printers located in a store area, each of the receipt printers including a paper conveyer, a server that stores location information indicating a position coordinate of each of the receipt printers in the store area, one or more base stations having a wireless communication range covering the store area, the method comprising:
designating one of the plurality of receipt printers as an associated peripheral station to be communicated with for receipt printing by the mobile POS terminal;
determining a position coordinate of the mobile POS terminal based on a wireless signal received from at least one of the one or more base stations by a wireless communication interface of the mobile POS terminal;
obtaining the location information from the server;
selecting based on the position coordinate of the mobile POS terminal and the location information, one of the plurality of receipt printers that is closest to the mobile POS terminal, other than the associated receipt printer, to be an alternative receipt printer to be recommended for receipt printing;

generating a print job and controlling the wireless communication interface to transmit the print job to cause the associated receipt printer to print a receipt based on the print job;

determining whether or not the print job is properly executed by the associated receipt printer based on a response signal from the associated receipt printer;

displaying a screen indicating the alternative receipt printer on a display of the mobile POS terminal; and causing the alternative receipt printer to print the receipt upon a user operation to use the alternative receipt printer on the screen.

10. The method according to claim 9, wherein each of the plurality of receipt printers determines its own position coordinate based on a wireless signal from at least one of the one or more base stations, and transmits its determined position coordinate.

11. The method according to claim 9, wherein the screen indicates also the associated receipt printer.

12. The method according to claim 9, wherein the screen includes a selectable object to select one of the plurality of receipt printers to be used for receipt printing.

13. The method according to claim 9, wherein the screen includes a selectable object corresponding to the alternative receipt printer for selecting use of the alternative receipt printer for receipt printing and a non-selectable object corresponding to the associated receipt printer.

14. The method according to claim 13, wherein
the selectable object corresponding to the alternative receipt printer has a predetermined shape and is displayed in a first display manner, and
the screen includes one or more second selectable objects corresponding to other receipt printers that are not the closest to the mobile POS terminal, the second selectable objects having the predetermined shape and being displayed in a second display manner different from the first display manner.

15. The operation method according to claim 9, further comprising:
displaying a screen for selecting one of the plurality of receipt printers as the receipt printer on the display of the mobile POS terminal.

16. The method according to claim 9, further comprising:
reading a product code with an optical code reader of the mobile POS terminal.

* * * * *